United States Patent [19]
Kondo

[11] Patent Number: 5,688,413
[45] Date of Patent: Nov. 18, 1997

[54] STUD WELDING APPARATUS

[75] Inventor: Yoshiteru Kondo, Toyoyaski, Japan

[73] Assignee: Emhart Inc., Newark, Del.

[21] Appl. No.: 602,416

[22] Filed: Feb. 16, 1996

[30] Foreign Application Priority Data

Feb. 16, 1995 [JP] Japan .................................. 7-028222

[51] Int. Cl.$^6$ .................................................. B23K 9/20
[52] U.S. Cl. ............................................................. 219/98
[58] Field of Search ..................................... 219/98, 99

[56] References Cited

U.S. PATENT DOCUMENTS

| | | |
|---|---|---|
| 2,256,480 | 9/1941 | Hughes . |
| 2,486,274 | 10/1949 | Graham . |
| 3,519,787 | 7/1970 | Kroy ............................. 219/98 |
| 3,838,786 | 10/1974 | Gachmann et al. . |
| 3,852,559 | 12/1974 | Tauern . |
| 3,909,694 | 9/1975 | Yokota et al. ................. 219/98 |
| 4,594,495 | 6/1986 | Glorioso . |
| 5,030,815 | 7/1991 | Glorioso ....................... 219/98 |

FOREIGN PATENT DOCUMENTS

| | | |
|---|---|---|
| 954458 | 4/1964 | United Kingdom . |
| 975256 | 11/1964 | United Kingdom . |

*Primary Examiner*—Clifford C. Shaw
*Attorney, Agent, or Firm*—E. D. Murphy

[57] ABSTRACT

According to the present invention, the inputs of the pilot power supply and the welding arc power supply are connected to a common terminal and there is provided the switching means to selectively switch the operations of the pilot power supply and the welding arc power supply with the switching means switching the power supplies to activate the pilot power supply when a pilot arc should be produced. Thus, the power supply system requires only one secondary winding in the transformer, and the single secondary winding is sufficient to make it possible to use a small and low-priced transformer. This results in reduction in the size as well as the cost of the power supply system. In addition, since the switching means can be composed of the rectifying thyristors connected to the A.C. input port and the relay contacts connected to the rear stage from the thyristor stage, so that the relay contacts select the operations of the pilot power supply and the welding arc power supply and, the thyristors determine the ON-OFF state of the electric current flowing to each of the power supplies. Thus, it is possible for the pilot power supply and the welding arc power supply to use the rectifying thyristors and the circuit concerned in common so as to simplify the circuit of the power supply and to reduce its price.

5 Claims, 4 Drawing Sheets

STUD WELDING APPARATUS

FIELD OF INVENTION

The present invention relates to a stud welding apparatus and particularly to a stud welding apparatus in which electric power for forming a pilot arc and a subsequent welding arc is supplied from a power supply system having a pilot power supply and a welding arc power supply.

PRIOR ART

There is a well-known stud welding apparatus comprising a welding gun to hold a stud so that the welding tip can be in contact with a base metal, a power supply system connected to the welding gun so as to supply a predetermined electric power between the stud and the base metal, and a controller for controlling the power supply to supply the electric power to form the pilot arc and the subsequent main arc to the welding gun and for controlling the welding gun to bring the stud into press-contact with the base metal. This stud welding apparatus is used to weld studs to a vehicle body or the like and, for example, a heat insulation sheet is mounted on the vehicle body or the like by using clips which are engaged with the studs.

The power supply system of the stud welding apparatus has a pilot power supply to rectify A.C. current to D.C. current to supply a pilot current for forming a pilot arc and a welding arc power supply to rectify A.C. current to D.C. current to supply a welding arc current for forming a welding arc. The welding arc power supply has a charging capacitor in which an energy or power for the welding arc is charged. The welding arc is formed by supplying electric energy from the charging capacitor at the time of welding. Thus, the stud is welded to the base metal.

SUMMARY OF THE INVENTION

In the power supply system of the above-described stud welding apparatus, the pilot power supply and the welding arc power supply should be formed in different discrete systems since the current and voltage for the pilot arc are different from the current and voltage applied from the welding arc power supply to the charging capacitor. Therefore, in the conventional power supply system, a transformer is provided with two secondary windings. Should there be only one secondary winding, two transformers are used. Inasmuch as a transformer occupies a large space in the power supply system, the use of two transformers or a transformer with two secondary windings inevitably increases the size of the power supply system.

Accordingly, the present invention aims to provide a stud welding apparatus in which a power supply system requiring only one secondary winding is used, thereby reducing the size as well as the cost of the power supply system of the stud welding apparatus.

DESCRIPTION OF THE PREFERRED EMBODIMENT

In order to achieve the above-mentioned object, according to the present invention, there is provided a stud welding apparatus comprising a welding gun adapted to hold a stud to bring the tip of the stud into contact with a base metal and a power supply system to supply the welding gun with an electric power which forms a pilot arc and a subsequent welding arc between the stud and the base metal; the power supply system including a pilot power supply to rectify A.C. current to D.C. current to apply a pilot current to the welding gun to form the pilot arc, and a welding arc power supply to rectify A.C. to current to D.C. current to apply a welding current to the welding gun to form the welding arc; the welding arc power supply having a charging capacitor in which an electric power for the welding arc is charged; characterized in that the input of the pilot power supply and the input of the welding arc power supply are connected to a common input terminal and there are provided switching means to selectively switch the operations of the pilot power supply and the welding arc power supply, and the switching means switches the power supplies so as to activate the pilot power supply when a pilot arc should be produced. Thus, only one secondary winding of the transformer is needed in the power supply to reduce the size and the cost of the transformer.

According to the present invention, the above-described stud welding apparatus is provided with a controller connected to the power supply system and the welding gun to control the timing for applying the electric power for the pilot arc and the subsequent welding arc from the power supply system to the welding gun with, and wherein the controller includes capacitor voltage detection means to detect the voltage across the charging capacitor, and the controller switches the switching means so that when welding operation is not carried out and the energy in the charging capacity is insufficient, and electric current is applied into the welding arc power supply or so that when the welding operation is being carried out and the charging capacitor has been fully charged, the electric current is applied into the pilot power supply. It is also preferable that the switching means comprises rectifying thyristors connected to an A.C. input port and relay contacts connected to the rear stage from the thyristor stage, so that the relay contacts selects the operations of the pilot power supply and the welding arc power supply and the thyristors determine ON-OFF of the electric current flowing to each of the power supplies. It is also possible that in the welding arc power supply, voltage doubler rectification is done by using the rectifying thyristors to supply the charging capacitor with the rectified current, and in the pilot power supply full-wave rectification is carried out by using the rectifying thyristors to supply the welding gun with the rectified current.

BRIEF DESCRIPTION OF ACCOMPANYING DRAWINGS

DESCRIPTION OF THE PREFERRED EMBODIMENT

Figure 1:
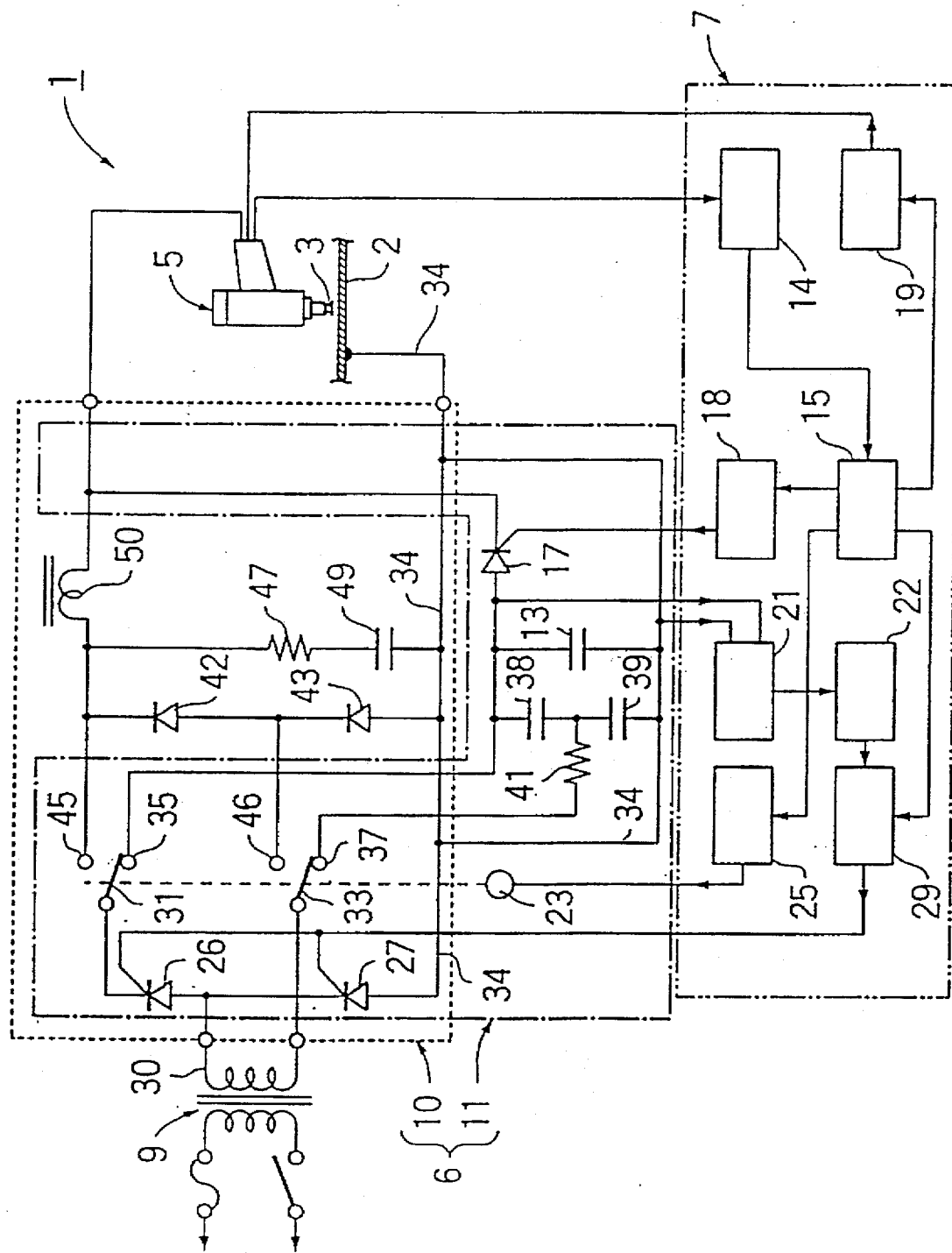
FIG. 1 is a circuit diagram of a power supply system and a block diagram of a controller in a stud welding apparatus according to the present invention.
Figure 2:
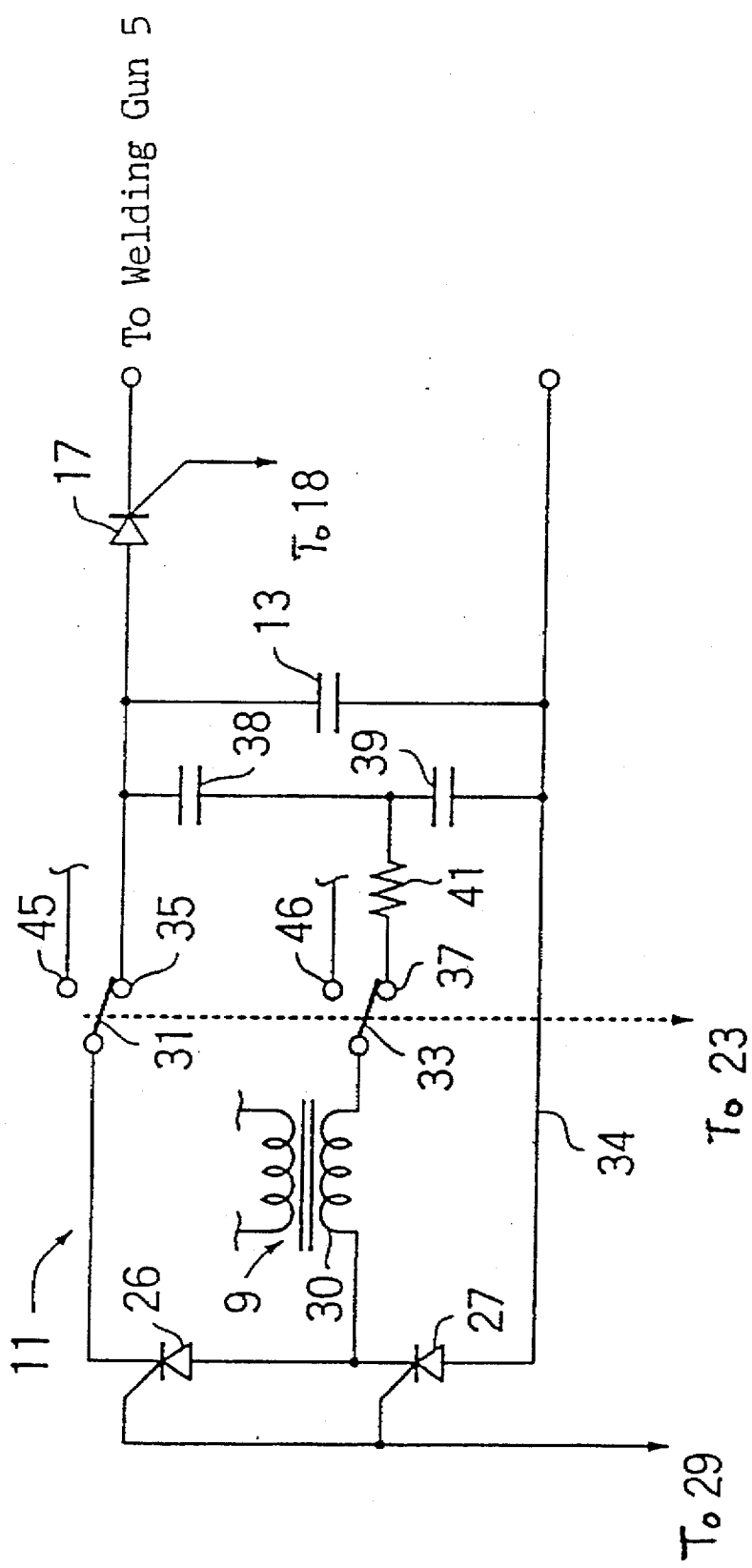
FIG. 2 is a circuit diagram of the welding arc power supply of the power supply system of FIG. 1.
Figure 3:
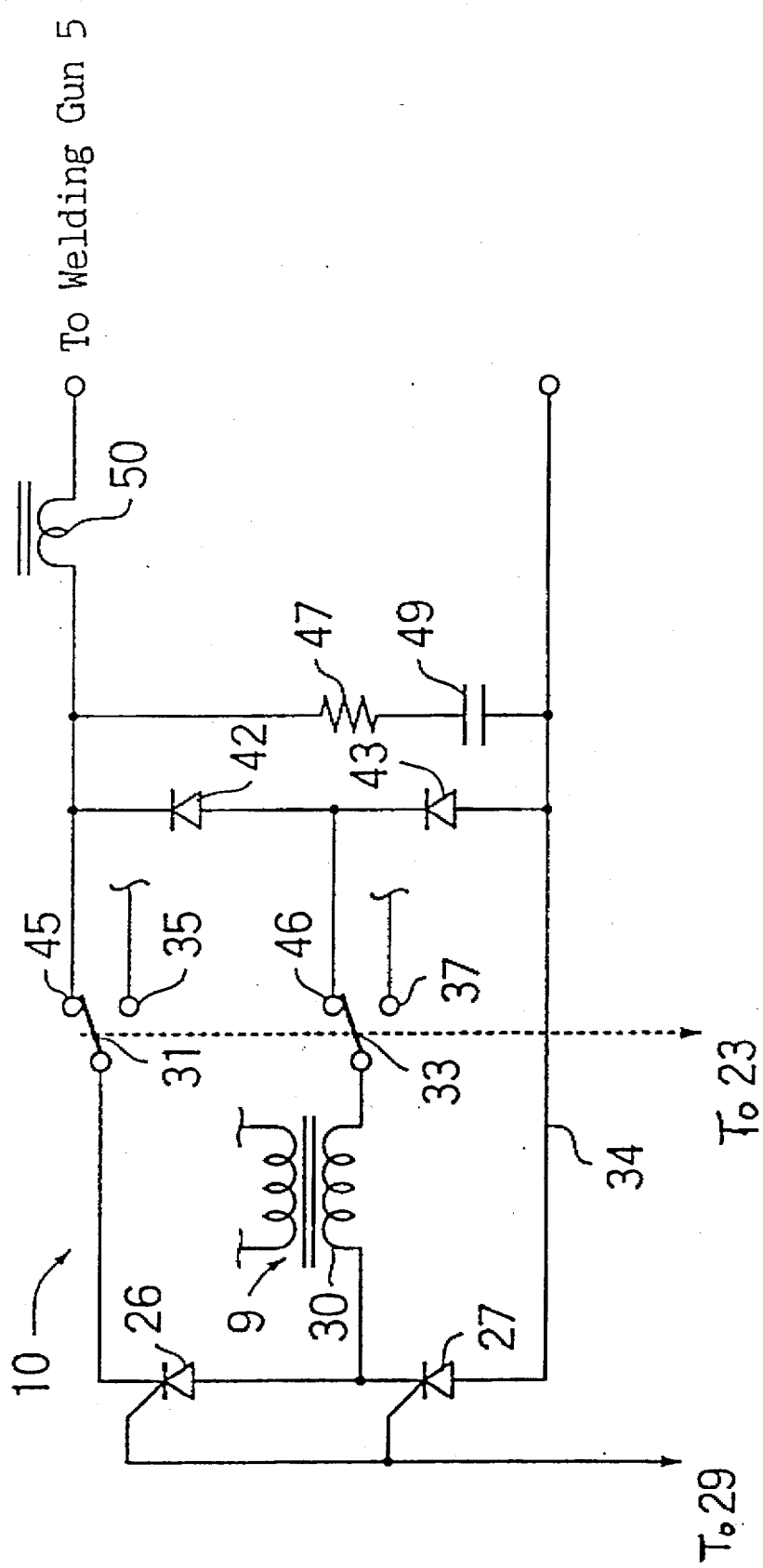
FIG. 3 is a circuit diagram of the pilot power supply of the power supply system of FIG. 1.
Figure 4:
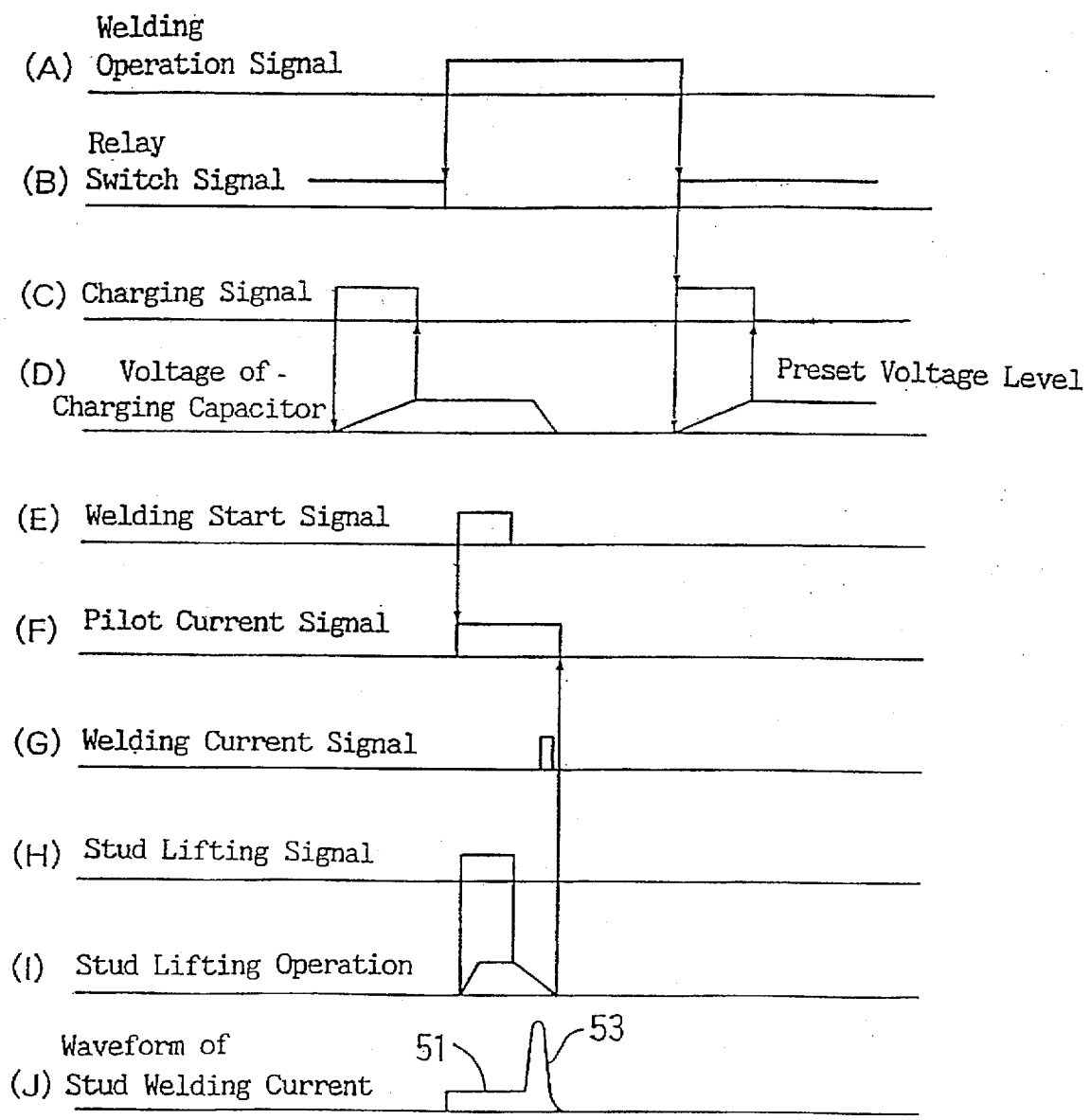
FIG. 4 is a diagram showing the welding sequence of the stud welding apparatus of FIG. 1.

The present invention is described further by way of an embodiment with reference to accompanying drawings. FIG. 1 shows a circuit diagram of a stud welding apparatus 1 of the present invention. FIGS. 2 and 3 are respectively circuit diagrams of a welding arc power supply and a pilot power supply in a power supply system. FIG. 4 shows the welding sequence of the stud welding apparatus 1. In FIG. 1, the stud welding apparatus 1 according to the present invention comprises a welding gun 5 to hold a stud 3 so that the welding portion of the stud can be in contact with a base metal 2, and a power supply system 6 connected to the welding gun so as to apply a predetermined power between the stud 3 and the base metal 2. The stud welding apparatus also has a controller 7 which is connected to the power supply system 6 and the welding gun 5. The controller 7 controls the power supply system so as to apply a power to form a pilot arc and a subsequent main arc (see waveforms shown in FIG.4 (J)) between the stud 3 and the base metal 2, and controls the welding gun so as to bring the stud in press-contact with the base metal during a predetermined period of time.

The power supply system 6 is connected with a secondary winding of a transformer 9 to receive A.C. power therefrom. The primary winding of the transformer 9 is provided with a power switch and a fuse in a well-known manner. The power supply system 6 comprises a pilot power supply 10 indicated by a broken line encircling the same and a welding arc power supply 11 indicated by a single-dot-chained line encircling it. The pilot power supply 10 rectifies A.C. current to D.C. current to apply a power for forming a pilot arc to the welding gun 5. The welding arc power supply 11 rectifies A.C. current to D.C. current to apply a welding arc forming power to the welding gun 5. In the same way as the conventional power supply, the welding arc power supply 11 is provided with a charging capacitor 13 in which electric energy or power for welding arc is charged.

The controller 7 encircled by a double-dot-chained line in FIG.1 comprises: a welding operation sensor 14 connected to the welding gun 5 to detect a welding operation signal and a welding start signal of the welding gun 5; a welding sequence control portion 15 to control welding sequences of the welding gun 5 and the power supply system 6 in response to the signals from the welding operation sensor 14; a discharge control portion 18 in response to the signal from the welding sequence control portion 15 to control a discharge thyristor 17 which discharges the electric energy from the charging capacitor 13 of the welding arc power supply 11; and a stud-lift driver portion 19 to apply a stud-lifting power to the lifting coil (not shown) of the welding gun 5 in response to a stud-lifting signal from the welding sequence control portion 15. The controller 7 also comprises: a charging voltage sensor 21 to detect a charging voltage in the charging capacitor 13 of the welding arc power supply 11; a charging voltage setting portion 22 connected to the charging voltage sensor 21 to generate an output signal to stop supplying the power to the charging capacitor 13 when charging reaches a preset voltage level; a relay control portion 25 connected to the welding sequence control portion 15 to control a relay 23 which switches two transfer-switch-contacts which are positioned in the power supply system 6; and a rectifying thyristor control portion 29 which responds to the signals from the welding sequence control portion 15 and the charging voltage setting portion 22 to control the ON/OFF operation of two rectifying thyristors 26 and 27 in the power supply system 6 by sending the signals to the gates of the two thyristors.

The power supply system 6 is connected to a common input terminal, i.e., a secondary winding 30 of the transformer 9, as inputs of both the pilot power supply 10 and the welding arc power supply 11. The pilot power supply 10 and the welding arc power supply 11 are so constructed that their operations are selectively switched by two relay contacts 31 and 33 which are respectively transfer switches of the relay 23. At a normal position of each of the contacts of the relay 23 which is not energized, the relay contacts 31 and 33 are connected so that the welding arc power supply 11 is active as shown in FIG. 1. When the relay 23 is driven by a signal from the relay control portion 25 of the controller 7, the contacts 31 and 33 are connected so that the pilot power supply 10 is activated. The two rectifying thyristors 26 and 27 connected to the secondary winding 30 function as switching means to selectively apply A.C. power to those power supplies. To the gates of the rectifying thyristors 26 and 27, signals are sent from the rectifying thyristor control portion 29 of the controller 7 so that they turn the supply of A.C. current ON or OFF in response to the gate signals.

As described above, at a normal condition, the relay contacts 31 and 33 are switches at their normal positions to activate the welding arc power supply 11 of the power supply system 6. Thus, explanation is first made on the welding arc power supply 11. In FIG. 2, the welding arc power supply 11 of the circuit in FIG. 1 is redrawn to facilitate understanding of the power supply 11. Thus, FIG. 2 should be referred to as well as FIG. 1. In the welding arc power supply 11, voltage doubler rectification is carried out by means of the two rectifying thyristors 26 and 27 and two capacitors 38 and 39 corresponding to the thyristors, which are provided for smoothing and voltage doubler rectification. To one end of the secondary winding 30 of the transformer 9, the anode of the rectifying thyristor 26 and the cathode of the rectifying thyristor 27 are connected and the other end of the secondary winding 30 is connected to the center terminal of the relay contact 33. The cathode of the rectifying thyristor 26 is connected to the center terminal of the relay contact 31 while the anode of the rectifying thyristor 27 is connected to a common wire 34 of the power supply 11. The common wire 34 serves as the bus for grounding of the power supply system 6 and is connected to the base metal 2.

The welding arc power supply site terminals 35 and 37 of the respective relay contacts 31 and 33 are connected to the two capacitors 38 and 39 for voltage doubler rectification and smoothing, which are positioned in parallel with the thyristors 26 and 27. Between the terminal 37 and the connection of the two capacitors, a current limit resistor 41 is positioned to prevent overcurrent. For the prevention of overcurrent, the thyristors 26 and 27 may be pulsed to control the phase of the ON time to limit the current of the thyristors. The A.C. voltage of the secondary winding 30 of the transformer 9 is double-voltage-rectified and smoothed by means of the two rectifying thyristors 26 and 27 and the voltage doubler rectifying and smoothing capacitors 38 and 39. The rectified voltage is accumulated in the charging capacitor 13. The voltage in the charging capacitor 13 is monitored by the charging voltage sensor 21 of the controller 7. When it reaches a set level, a signal is issued from the charging voltage setting portion 22 to the thyristor control portion 29 to turn the thyristors 26 and 27 off. The discharge control portion 18 generates a signal to the gate of the discharge thyristor 17 at a predetermined time after the charging voltage reaches the set voltage in the charging capacitor 13, to that electric energy for the welding arc is applied to the welding gun 5.

The pilot power supply 10 is activated when the relay 23 is driven by the signal from the relay control portion 25 of the controller 7. In other words, a circuit for the pilot power supply 10 is formed as shown in FIG. 3 when the relay contacts 31 and 33 are switched to the sides that the pilot power supply 10 is activated. In FIG. 3 as well as FIG. 1, the pilot power supply 11 serves to carry out full-wave rectification by means of the two rectifying thyristors 26 and 27 and two diodes 42 and 43. As illustrated, the rectifying thyristors 26 and 27 are used in common with the welding arc power supply 10 and their connection to the transformer 9 and the relay contacts 31 and 33 is retained as it stands. This allows the circuit of the pilot power supply 10 to be of simple structure. Since the connection of the two rectifying thyristors in the pilot power supply 10 is the same as in the welding arc power supply 11 as known from the above, its explanation is omitted.

In the pilot power supply 10, power supply side terminals 45 and 46 of the respective relay contacts 31 and 33 are connected to the two diodes 42 and 43 for full-wave rectification positioned in parallel with the thyristors 26 and 27, thus, forming a bridge rectifying circuit. The current is full-wave rectified in the bridge circuits of the thyristors 26 and 27 and the diodes 42 and 43 and further fed to a smoothing circuit which comprises a resistor 47 and a capacitor 49 both connected in parallel with the bridge circuit, and a choke coil 50 at the output portion to the welding gun 5. In the smoothing circuit, the rectified current is smoothed and has a drooping current-voltage characteristic (that is, the voltage becomes lower as the current becomes higher). Thus, the characteristic of the current is suitable for the generation of a pilot arc, and the suitable current is applied to the welding gun 5.

The operation of the stud welding apparatus 1 as described above is explained also with reference to the welding sequence shown in FIG. 4. When the power switch (for example, adjacent to the primary winding of the transformer 9) of the stud welding apparatus 1 is turned on, the respective portions of the controller 7 are enabled and A.C. voltage appears in the secondary winding 30 of the transformer 9. The welding arc power supply 11 of the power supply system 6 is normally effective by means of the relay 23 as stated above. Since a power has not yet been charged in the charging capacitor 13, the charging voltage sensor 21 detects an insufficient amount of charges, which is transmitted to the charging voltage setting portion 22. A charging signal as shown in FIG. 4(c) is fed from the setting portion 22 to the thyristor control portion 29 to turn-on the rectifying thyristors 26 and 27. The ON states of the two thyristors 26 and 27 allows a voltage by the voltage doubler rectification to appear across the capacitors 38 and 39 so that the electric energy based on that voltage is accumulated in the charging capacitor 13. When the voltage in the charging capacitor 13 reaches a predetermined level as shown in FIG.4 (D), the charging voltage sensor 21 detects such level and informs it to the charging voltage setting portion 22 to cease the charging signal so that the thyristors 26 and 27 are turned off.

When the operator causes the stud 3 held by the welding gun 5 to be in contact with the base metal 2 or presses a start-up switch (not shown) of the welding gun 5, a welding operation signal shown in FIG. 4(A) is fed from the welding gun 5 to the welding operation sensor 14. From the welding operation sensor 14, the circuit or relay switching signal as shown in FIG. 4(B) is fed to the relay control portion 25 through the welding sequence control portion 15 to drive the relay 23 so that the relay contacts 31 and 33 are changed to the sides that the pilot power supply 10 is enabled. Thus, the circuit of the power supply system 6 is switched from the state shown in FIG. 2 to that of FIG. 3 so that the power supply 10 becomes active. Subsequently, when the welding operation sensor 14 detects that the welding start condition has been prepared, i.e., for example, that the stud 3 held by the welding gun 5 has been brought in contact with the base metal 2 and the start-up switch (now shown) has been pressed, the sensor sends a welding start signal shown in FIG. 4 (E) to the welding sequence control portion 15.

The welding sequence control portion 15 sends a pilot current signal shown in FIG. 4 (F) to the rectifying thyristor control portion 29 to turn-on the rectifying thyristors 26 and 27. The ON-state thyristors are associated with the diodes 42 and 44 to full-wave-rectify the A.C. current of the secondary winding 30 of the transformer 9 and the full-wave-rectified current is formed, by the smoothing circuit comprising the resistor 47, the capacitor 49 and the coil 50, into a pilot current with the drooping characteristic. The rectified and smoothed pilot current is applied to the welding 5.

Further, the welding sequence control 15 sends, at a predetermined timing, a stud-lift signal shown in FIG. 4 (H) to the stud-lift driving portion 19 to drive the stud-lift coil (not shown) of the welding gun 5 to slightly raise the stud 3 from the base metal 2 for generating a pilot arc discharge between the base metal 2 and the stud 3. The pilot arc discharge is shown in a flat portion 51 of a stud welding current waveform shown in FIG. 4 (J). The pilot arc is kept for a predetermined time. At the end of the time, the welding sequence control portion 15 sends a welding current signal of FIG. 4 (G) to the discharge control portion 18 to turn-on the discharge thyristor 17 of the welding arc power supply 11. Thus, electric energy accumulated in the charging capacitor 13 is supplied to the welding gun 5 to apply a welding arc current as shown in a waveform 53 in FIG. 4 (J) between the stud 3 and the base metal 2 to generate a welding arc to melt predetermined portions of the stud 3 and the base metal 2.

When a predetermined time elapses, the welding sequence control portion 15 ceases the stud-lift signal of FIG. 4 (H) which was sent to the stud-lift driving portion 19. Then, the stud 3 is brought closer to the base metal 2 and into press-contact with the base metal 2 within a predetermined time after the peak of the welding current so that the welding operation is completed. After the completion of the welding, the pilot current signal sent from the welding sequence control portion 15 to the rectifying thyristor control portion 29 disappears. Then, the gate voltage of the rectifying thyristors 26 and 27 is stopped. Thus, one cycle of a stud welding operation is completed. When the welding gun 5 is apart from the base metal 2 after the completion of the welding, the welding operation signal (See FIG. 4 (A)) from the welding gun 5 is stopped to reactivate the welding arc power supply 11 so that charging in the charging capacitor 13 is resumed for preparation of the next stud welding.

I claim:

1. A stud welding apparatus comprising a welding gun adapted to hold a stud to bring the tip of the stud into contact with a base metal and a power supply system to supply the welding gun with an electric power which forms a pilot arc and a subsequent welding arc between the stud and the base metal; said power supply system comprising a pilot power supply to rectify A.C. current to D.C. current to apply a pilot current to the welding gun to form the pilot arc;

a welding arc power supply to rectify A.C. current to D.C. current to apply a welding current to the welding gun to form the welding arc, said welding arc power supply including a charging capacitor in which an electric power for the welding arc is accumulated;

a power transformer including a primary winding and a secondary winding adapted to provide power input to said pilot power supply and to said welding arc power supply; and a switching system connecting said secondary winding sequentially to said pilot power supply to produce said pilot current and to said welding arc power supply to produce said welding current.

2. The stud welding apparatus according to claim 1, wherein said switching system comprises a controller connected to the power supply system and the welding gun to control the timing for applying the electric power for the pilot arc and the subsequent welding arc from the power supply system to the welding gun, and wherein said controller includes capacitor voltage detection means to detect the voltage across the charging capacitor, said controller operating said switching system so that when welding operation is not carried out and the energy in the charging capacitor is insufficient, and electric current is applied into the welding arc power supply or so that when the welding operation is being carried out, and the charging capacitor has been fully charged, the electric current is applied into the pilot power supply.

3. A stud welding apparatus according to claim 1, wherein said single secondary winding of a transformer is connected to said pilot power supply and to said welding arc power supply by a common terminal.

4. A stud welding apparatus according to claim 1 wherein said switching system comprises rectifying thyristors connected to an A.C. input port and relay contacts connected to the output from said thyristors, so that the relay contacts select the operations of the pilot power supply and the welding arc power supply and the thyristors control the electric current flowing to each of the power supplies.

5. The stud welding apparatus according to claim 4 wherein, in the welding arc power supply, said rectifying thyristors are connected to provide voltage doubling rectification to said charging capacitor, and in the pilot power supply, said rectifying thyristors are connected to supply the welding gun with full-wave rectified current.

* * * * *